US011335025B2

(12) United States Patent
Chen

(10) Patent No.: US 11,335,025 B2
(45) Date of Patent: May 17, 2022

(54) METHOD AND DEVICE FOR JOINT POINT DETECTION

(71) Applicant: PEGATRON CORPORATION, Taipei (TW)

(72) Inventor: Po-Sen Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 175 days.

(21) Appl. No.: 16/937,469

(22) Filed: Jul. 23, 2020

(65) Prior Publication Data

US 2021/0027484 A1 Jan. 28, 2021

(30) Foreign Application Priority Data

Jul. 25, 2019 (TW) ................................. 108126311

(51) Int. Cl.
*G06K 9/00* (2022.01)
*G06T 7/73* (2017.01)
*G06N 3/04* (2006.01)
*G06N 3/08* (2006.01)
*G06V 10/25* (2022.01)
*G06V 40/10* (2022.01)

(52) U.S. Cl.
CPC ................. *G06T 7/73* (2017.01); *G06N 3/04* (2013.01); *G06N 3/08* (2013.01); *G06V 10/25* (2022.01); *G06V 40/103* (2022.01); *G06T 2207/20084* (2013.01); *G06T 2207/30196* (2013.01)

(58) Field of Classification Search
CPC ............. G06T 7/73; G06T 2207/20084; G06T 2207/30196; G06N 3/04; G06N 3/08; G06N 3/0454; G06V 10/25; G06V 40/103; G06V 10/82; G06V 40/10; G06K 9/6271
USPC .......................................................... 382/103
See application file for complete search history.

(56) References Cited

U.S. PATENT DOCUMENTS

| 10,826,629 | B1 * | 11/2020 | Lu ........................ G06K 9/6273 |
| 2016/0262685 | A1 | 9/2016 | Wagner et al. |
| 2018/0035082 | A1 * | 2/2018 | Patil ..................... G06V 40/171 |

FOREIGN PATENT DOCUMENTS

| CN | 103472920 | 12/2013 |
| CN | 105787439 | 7/2016 |
| WO | 2018026838 | 2/2018 |

* cited by examiner

*Primary Examiner* — Charlotte M Baker
(74) *Attorney, Agent, or Firm* — J.C. Patents

(57) ABSTRACT

The disclosure provides a method and a device for joint point detection. The method includes: obtaining a human body image and finding joint points to generate a human body pose skeleton; finding a trunk joint point corresponding to a trunk joint; defining a region of interest corresponding to the trunk joint point in the human body pose skeleton, wherein the trunk joint point is connected to a limb of a human body, the limb includes sub-limbs connected to each other via a limb joint; finding partitions corresponding to the sub-limbs based on the region of interest; defining a specific limb joint point based on the partitions; and defining the specific limb joint as corresponding to the limb joint and accordingly updating the human body pose skeleton.

20 Claims, 9 Drawing Sheets

METHOD AND DEVICE FOR JOINT POINT DETECTION

CROSS-REFERENCE TO RELATED APPLICATION

This application claims the priority benefit of Taiwan application serial no. 108126311, filed on Jul. 25, 2019. The entirety of the above-mentioned patent application is hereby incorporated by reference herein and made a part of this specification.

BACKGROUND

Technical Field

The disclosure relates to a method and a device for joint point detection, and in particular to a method and a device for joint point detection based on a multilayer neural network.

Description of Related Art

The main object of pose estimation is to find human body joint points and connect them correctly, and lastly generate a human body pose. However, if the four limbs in the image show certain specific angles so that the joint points of certain parts may not be detected, the joint points may be undetectable.

Please refer to FIG. 1A and FIG. 1B, wherein FIG. 1A shows a situation where joint points may be correctly detected, and FIG. 1B shows a situation where joint points may not be correctly detected. At present, there are two main methods for pose detection developed based on deep learning and Convolutional Neural Network (CNN): top-down and bottom-up. In FIG. 1A, since each limb may be clearly observed, both top-down and bottom-up may correctly detect the joint points in the image. However, in FIG. 1B, since joint points such as the left and right elbows may not be observed in the image, the joint points may not be correctly detected with either top-down or bottom-up.

SUMMARY

Accordingly, the disclosure provides a method and a device for joint point detection that may be used to solve the above technical issues.

The disclosure provides a method for joint point detection including the following steps: obtaining a human body image, and finding a plurality of joint points in the human body image to generate a human body pose skeleton, wherein the human body image includes a trunk joint and a first limb; finding a first trunk joint point corresponding to a first trunk joint in the joint points; defining a first region of interest corresponding to the first trunk joint point in the human body pose skeleton, wherein the first trunk joint is located in a trunk portion of a human body, the first trunk joint is connected to a first limb of the human body, the first limb includes a plurality of first sub-limbs, and the first sub-limbs are connected to each other via at least one first limb joint; finding a plurality of first partitions corresponding to the first sub-limbs based on the first region of interest; defining a first specific limb joint point based on the first partitions; defining the first specific limb joint point to correspond to the first limb joint, and updating the human body pose skeleton accordingly.

The disclosure provides a device for joint point detection, including a storage circuit and a processor. The storage circuit stores a plurality of modules. The processor is coupled to the storage circuit and accesses the modules to perform the following steps: obtaining a human body image, and finding a plurality of joint points in the human body image to generate a human body pose skeleton; finding a first trunk joint point corresponding to a first trunk joint in the joint points; defining a first region of interest corresponding to the first trunk joint point in the human body pose skeleton, wherein the first trunk joint is located in a trunk portion of a human body, the first trunk joint is connected to a first limb of the human body, the first limb includes a plurality of first sub-limbs, and the first sub-limbs are connected to each other via a first limb joint; finding a plurality of first partitions corresponding to the first sub-limbs based on the first region of interest; defining a first specific limb joint point based on the first partitions; defining the first specific limb joint point to correspond to the first limb joint, and updating the human body pose skeleton accordingly.

Based on the above, in the method of the disclosure, after one trunk joint point is found, a relevant region of interest may be defined accordingly, and the partitions corresponding to the sub-limbs of the limb of the trunk joint point may be found based on this region of interest. Then, the specific limb joint point may be found based on the partitions, and the human body pose skeleton may be updated by using the specific limb joint point as the limb joint point on the limb. In this way, even if there are covered limb joints (such as elbows, etc.) in the original human body pose skeleton, the method of the disclosure may still find the covered limb joints, thereby improving the detection performance of the human body joint points.

The purposes, technical contents, features, and effects achieved by the present disclosure will be more readily understood by the following specific embodiments in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
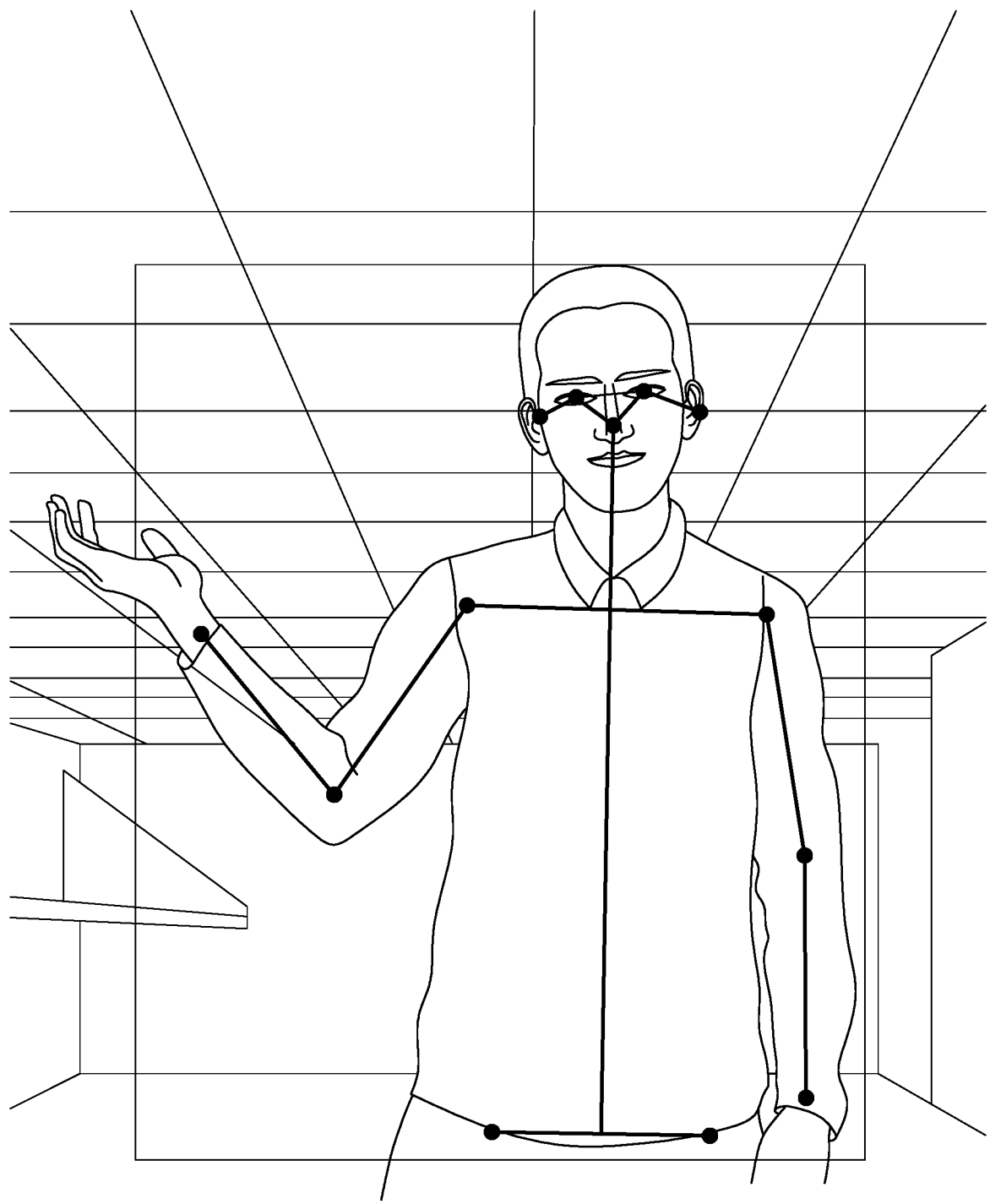
FIG. 1A shows a situation where joint points may be correctly detected.

In order to more clearly understand the features, contents and advantages of the present disclosure and the effects thereof, the present disclosure will be described in detail below with reference to the accompanying drawings in the form of embodiments.

Various embodiments of the present disclosure are described in detail below with reference to drawings. In the description of specification, a number of specific details are provided for a reader to have a more complete understanding of the present disclosure. However, the present disclosure is implemented while some or all of the specific details are omitted. The same or similar elements in the drawings are denoted by the same or similar symbols. It is to be noted that the drawings are for illustrative purposes only and do not represent the actual dimensions or quantities of the elements. Some of the details are not fully drawn in order to facilitate the simplicity of the drawings.

Figure 2:
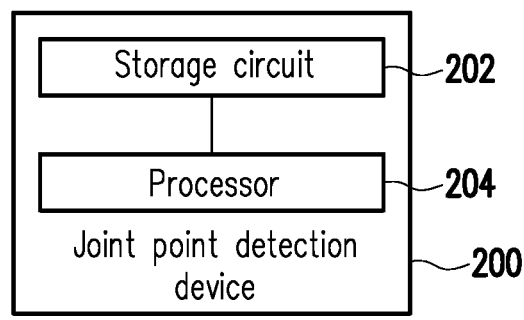
FIG. 2 is a diagram of a joint point detection device shown according to an embodiment of the disclosure.

FIG. 2 is a diagram of a joint point detection device shown according to an embodiment of the disclosure. In different embodiments, a joint point detection device 200 is, for example, a smart phone, a tablet computer, a personal computer, a workstation, a server, a notebook computer, or other electronic devices that may be used to perform image processing, analysis, and identification operations. However, the disclosure may not be limited thereto.

As shown in FIG. 2, the joint point detection device 200 includes a storage circuit 202 and a processor 204. The storage circuit 202 is, for example, any type of fixed or removable random-access memory (RAM), read-only memory (ROM), flash memory, hard disk, or other similar devices or a combination of the devices, and may be used to record a plurality of program codes or modules.

The processor 204 is coupled to the storage circuit 202 and may be a general-purpose processor, a special-purpose processor, a conventional processor, a digital signal processor, a plurality of microprocessors, one or a plurality of microprocessors combining digital signal processor cores, a controller, a microcontroller, an application-specific integrated circuit (ASIC), a field-programmable gate array (FPGA), any other types of integrated circuits, a state machine, a processor based on advanced RISC machine (ARM), and a similar product thereof.

In an embodiment of the disclosure, the processor 204 may access the modules and program codes recorded in the storage circuit 202 to implement the method of joint point detection proposed by the disclosure. The details are as follows.

Figure 3:
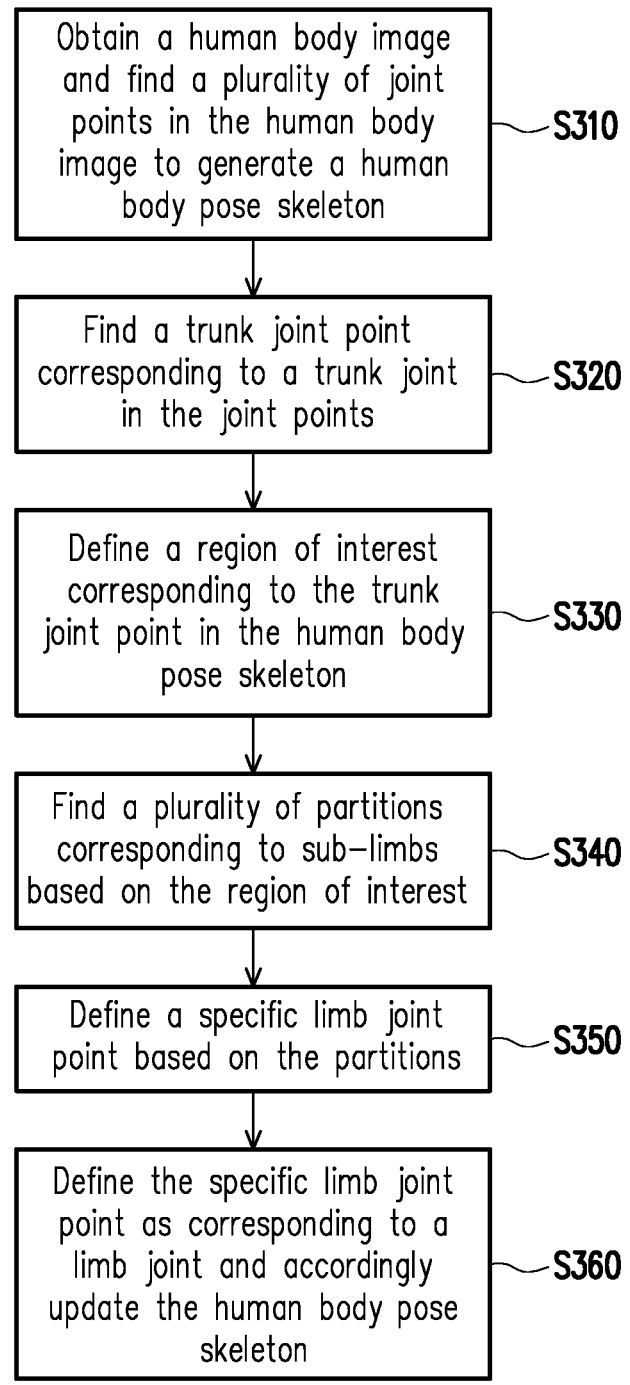
FIG. 3 is a flowchart of a method for joint point detection shown according to an embodiment of the disclosure.

FIG. 3 is a flowchart of a method for joint point detection shown according to an embodiment of the disclosure. The method of the present embodiment may be performed by the joint point detection device 200 of FIG. 2, and the details of each step of FIG. 3 are described below with the elements shown in FIG. 2.

In step S310, a human body image is obtained, and a plurality of joint points are found in the human body image to generate a human body pose skeleton. The processor 204 may obtain a human body image and find a plurality of joint points in the human body image to generate a human body pose skeleton. In different embodiments, the human body image may be an image of a human body captured by the joint point detection device 200 via an image capture element, a human body image taken from any image database or storage location, a frame image in a video including a human body, or any other images including a human body, but may not be limited thereto.

In addition, in different embodiments, the processor 204 may find a plurality of joint points on the human body in the human body image using a plurality of methods. For example, the processor 204 may find each joint point in the human body image based on a top-down method (such as a DensePose neural network) or a bottom-up method (such as an OpenPose neural network), or other similar pose estimation neural networks, and connect the joint points according to the human body structure to form a human body pose skeleton. In some embodiment, the human body pose skeleton may be regarded as a human body pose map, but the disclosure is not limited thereto.

More specifically, there are currently two main methods for pose detection developed based on deep learning and Convolutional Neural Network (CNN): top-down and bottom-up. In the top-down method, the image may be input to the CNN, and the location of a person may be partitioned via the first half of the CNN. Then, the feature map of each location is extracted via the second half of the CNN, and the feature maps are lastly input into a linear regression equation to calculate human joint points (that is, key points) of each person. An example of the top-down method is DensePose proposed by Facebook.

In the bottom-up method (such as OpenPose proposed by Carnegie Mellon University), the joint points that are in the input image are found via the CNN, and then the joint points are attempted to be correctly connected to each other according to the location of each person to produce a human body pose. However, in the top-down and bottom-up methods, if the four limbs in the image show certain specific angles so that the joint points of certain parts may not be detected, the joint points may be undetectable.

Figure 4A:
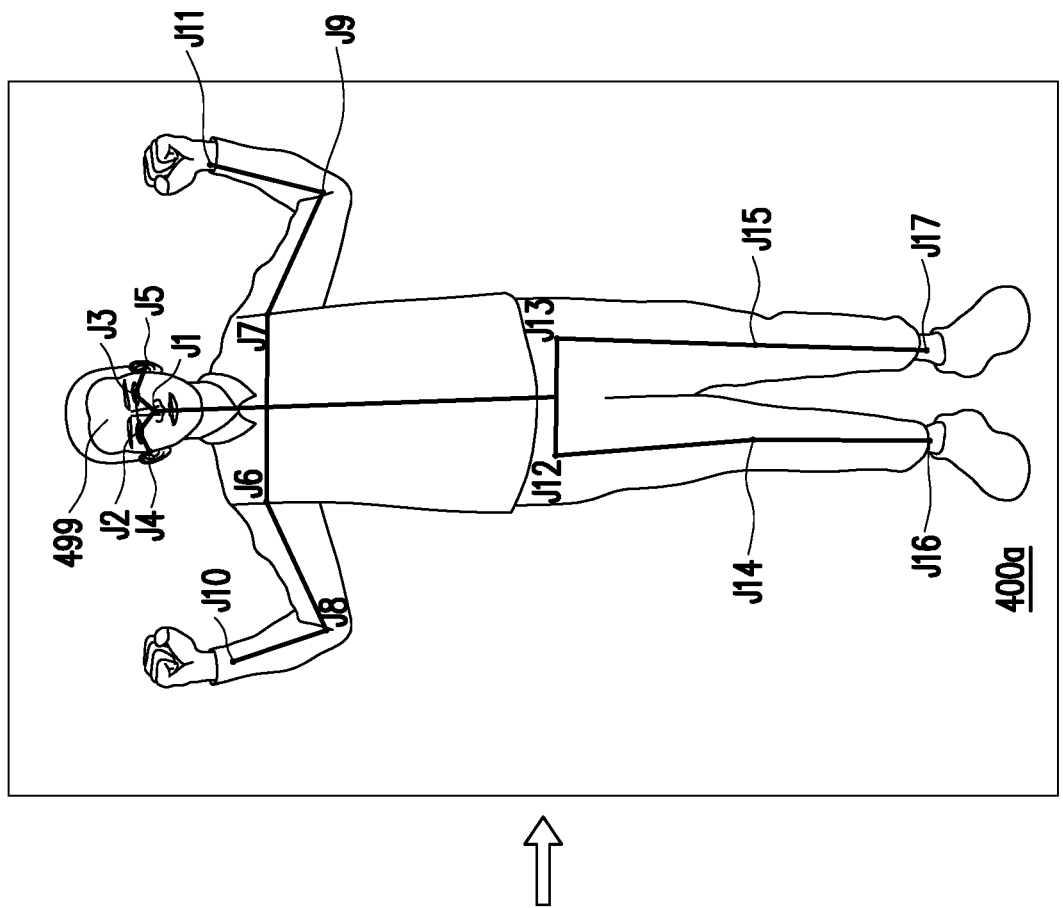
FIG. 4A is a human body image and a human body pose skeleton labeled with joint points shown according to an embodiment of the disclosure.
Figure 4A:
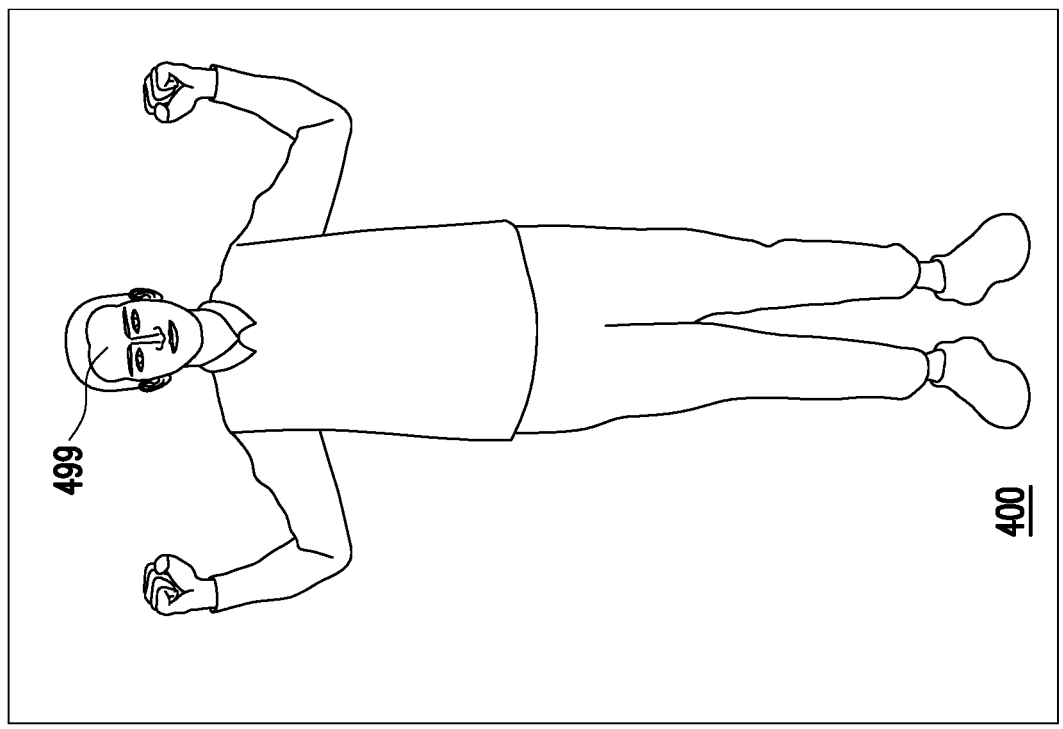

FIG. 4A is a human body image and a human body pose skeleton labeled with joint points shown according to an embodiment of the disclosure. As shown in FIG. 4A, after the processor 204 obtains a human body image 400 including a human body 499, joint points J1 to J17 may be found based on a pose estimation neural network, and the joint points J1 to J17 may be labeled and connected in the human body image 400 to generate a human body pose skeleton 400*a*.

Figure 1B:
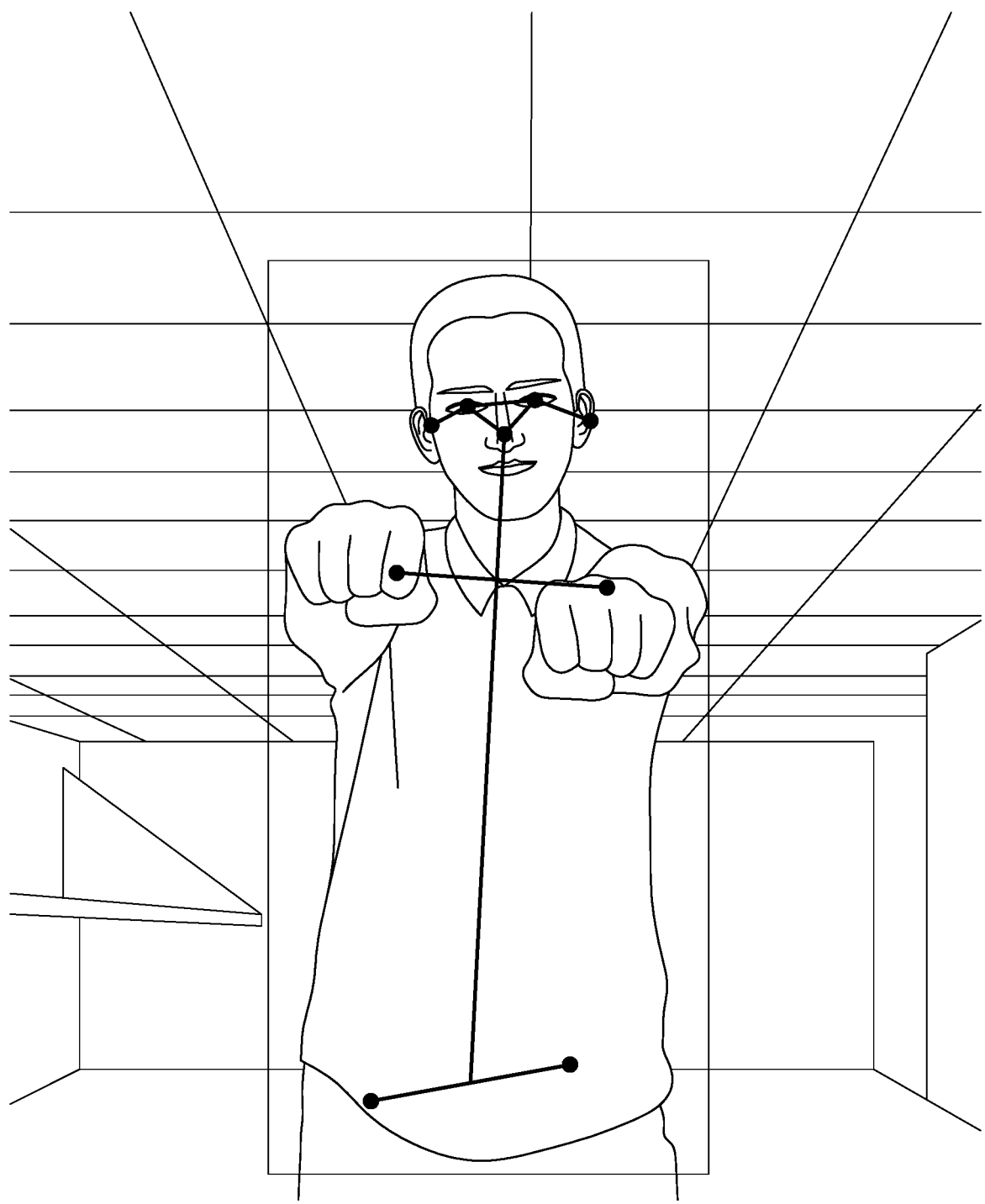
FIG. 1B shows a situation where joint points may not be correctly detected.

It should be understood that since none of the joints of the human body 499 is covered in the human body image 400, the joint points J1 to J17 may still be found via the above method. However, if the human body image shown in FIG. 1B is considered, the above method may not be able to successfully find the limb joint points that are readily covered such as elbows and knees. But even so, the above method may still ensure a certain detection accuracy of trunk joint points that are not readily covered (such as the joint points J6, J7, J12, and J13 that respectively correspond to the right shoulder, left shoulder, right hip, and left hip of the human body 499). Therefore, in the disclosure, the following operations may be performed based on the trunk joint points to find the limb joint points associated with each trunk joint point.

Referring to FIG. 3 again, in step S320, a trunk joint point corresponding to the trunk joint is found in the joint points. Specifically, in step S320, the processor 204 may find a trunk joint point corresponding to the trunk joint of the human body 499 in the joint points J1 to J17, wherein the trunk joint is located in the trunk portion of the human body. The trunk joint is connected to a limb of the human body 499. The limb includes a plurality of sub-limbs, and the sub-limbs are connected to each other via at least one limb joint. In the present embodiment, since the number of each joint point J1 to J17 (that is, 1 to 17) found via a pose estimation neural network corresponds to a specific joint, the processor 204 may directly find one of the joint points J1 to J17 for which the number corresponds to the trunk joint point as the trunk joint point under consideration. In FIG. 4A, since the joint points J6, J7, J12, and J13 corresponding to the numbers 6, 7, 12, and 13 are all trunk joint points, the processor 204 may use any one thereof as the trunk joint point under consideration.

In an embodiment of the disclosure, since the operations performed by the processor 204 based on each trunk joint point (that is, the joint points J6, J7, J12, and J13) are all similar, in the following, only the joint point J6 is exemplified. Those having ordinary skill in the art should be able to infer operations performed based on other trunk joint points (for example, the joint points J7, J12, and J13) accordingly.

When the joint point J6 (corresponding to the right shoulder) is considered as the trunk joint point, it may be known that the limb of the human body 499 to which the joint point J6 is connected is, for example, the right arm. Moreover, the sub-limbs included in this limb are the upper right arm and the lower right arm, respectively, and may be connected via the right elbow (that is, the limb joint).

Next, in step S330, a region of interest (ROI) corresponding to the trunk joint point is defined in the human body pose skeleton. Specifically, in step S330, the processor 204 may define a region of interest corresponding to the trunk joint point in the human body pose skeleton 400*a*.

Figure 4C:
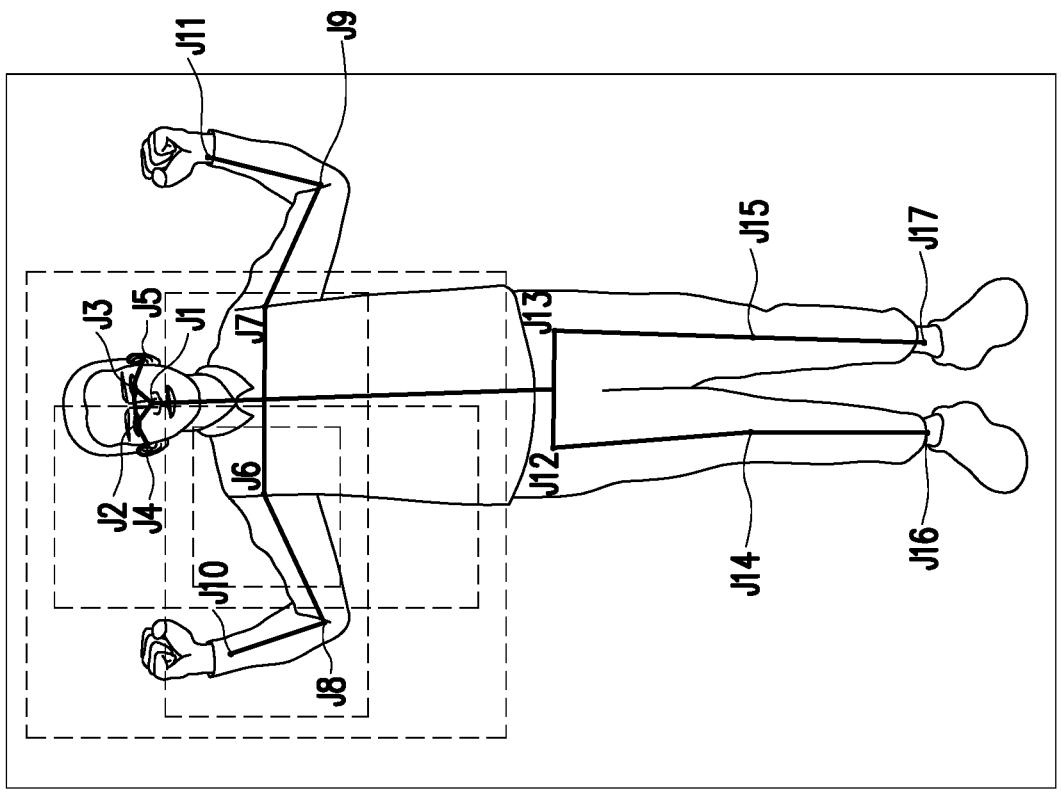
FIG. 4C is a diagram of regions of interest having different sizes shown according to FIG. 4B.
Figure 4B:
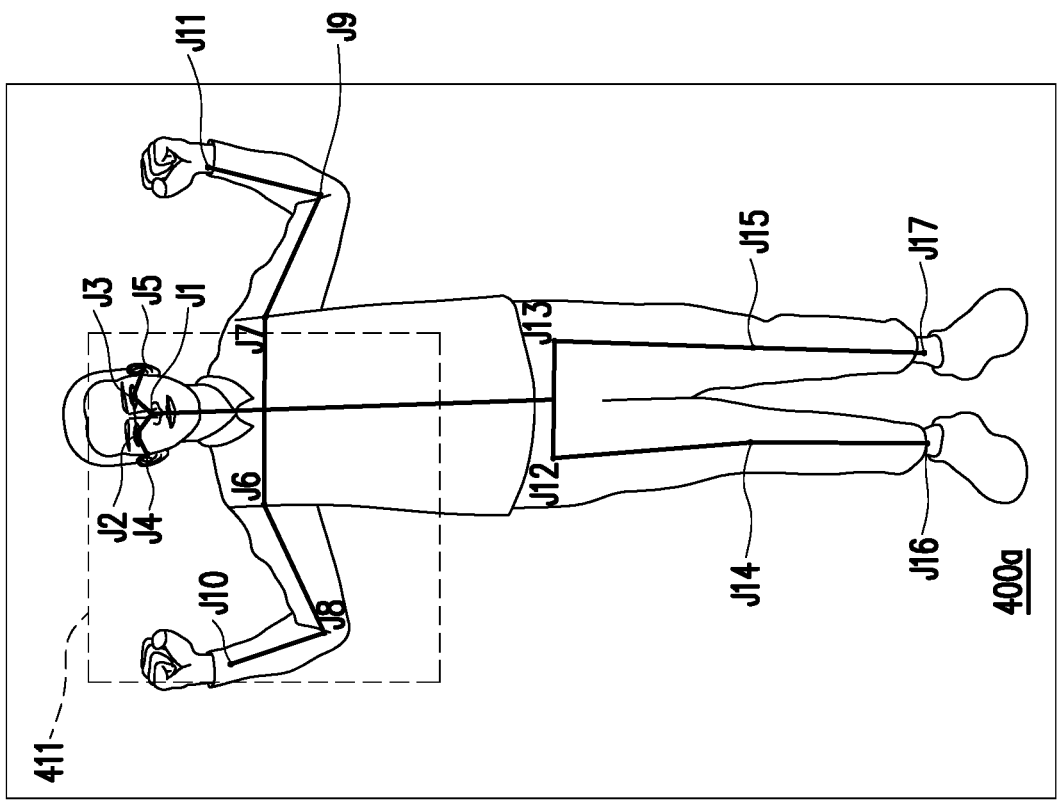
FIG. 4B is a diagram of labeling a region of interest in a human body pose skeleton shown according to FIG. 4A.

FIG. 4B is a diagram of labeling a region of interest in a human body pose skeleton shown according to FIG. 4A. In the present embodiment, the processor 204 may use the joint point J6 (that is, the trunk joint point under consideration) as the center, and extend a region of a specific size outward as a region of interest 411. In different embodiments, a designer may set the size of the region of interest 411 to other configurations as needed, which is not limited to the configuration shown in FIG. 4B. In some embodiments, the processor 204 may also define a plurality of regions of interest corresponding to a single trunk joint point at once.

FIG. 4C is a diagram of regions of interest having different sizes shown according to FIG. 4B. In FIG. 4C, any one of the dotted frames shown may be used as the region of interest of the joint point J6 (that is, the trunk joint point). In other embodiments, the processor 204 may also use all of the dotted frames in FIG. 4C as the regions of interest of the joint point J6 (that is, the trunk joint point), but may not be limited thereto.

Moreover, in other embodiments, the region of interest 411 does not necessarily need to use the trunk joint point as the center, and may only be any image region covering the trunk joint point, but the disclosure may not be limited thereto.

In step S340, a plurality of partitions corresponding to the sub-limbs are found based on the region of interest. Specifically, in step S340, the processor 204 may find a plurality of partitions corresponding to the sub-limbs (such as the upper right arm and the lower right arm) based on the region of interest. In detail, when the processor 204 previously used a pose estimation neural network (which may include a convolutional layer, a pooling layer, and a fully connected layer, etc.) to obtain the joint points J1 to J17, the convolutional layer in the pose estimation neural network may correspond to a feature map. In this case, the processor 204 may input the region of interest to a specific neural network (which may be a neural network having a convolutional layer, such as a CNN) adopting the feature map to find the partitions corresponding to the sub-limbs (such as the upper right arm and the lower right arm) via the specific neural network based on the region of interest.

In an embodiment, the specific neural network may generate a texture coordinate map (also referred to as a UV map) corresponding to the region of interest based on the feature map and find the partitions corresponding to the sub-limbs in the texture coordinate map. Those having ordinary skill in the art should understand that the texture coordinate map is a flat representation of the surface texture of a 3D object, and may generally be automatically generated by a software application and/or edited by a user.

Figure 5:
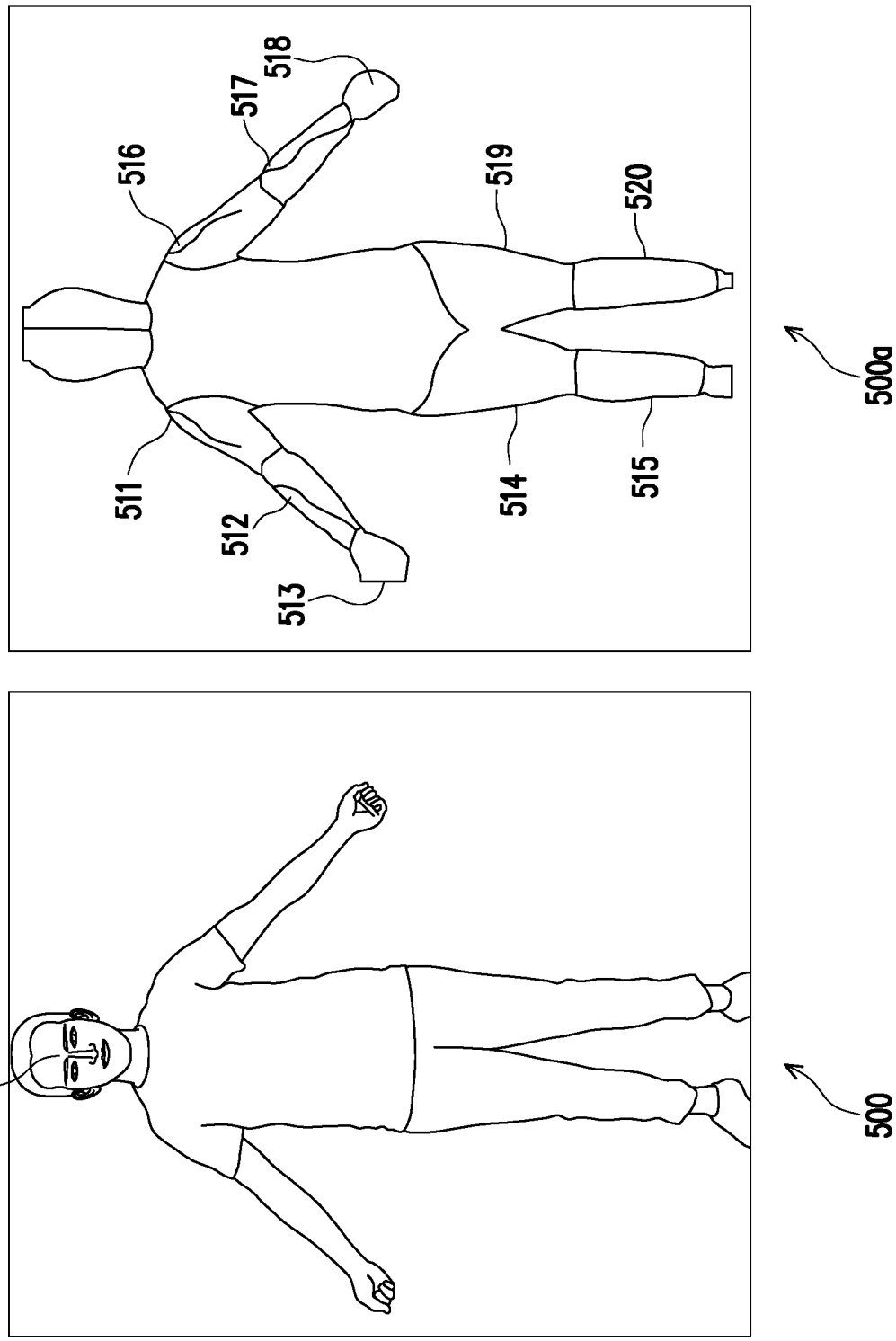
FIG. 5 is a human body image map and a corresponding texture coordinate map thereof shown according to an embodiment of the disclosure.

FIG. 5 is a human body image map and a corresponding texture coordinate map thereof shown according to an embodiment of the disclosure. In the present embodiment, in the case that the processor 204 concerns a human body image 500, when the processor 204 processes the human body image 500 using a pose estimation neural network, the pose estimation neural network (such as DensePose neural network) generates a texture coordinate map 500*a* corresponding to the human body image 500 at the same time. As may be seen from FIG. 5, the texture coordinate map 500*a* includes a plurality of partitions 511 to 520 that may respectively correspond to the upper right arm, lower right arm, right hand, right thigh, right shin, left upper arm, left lower arm, left hand, left thigh, and left shin of a human body 599, but may not be limited thereto. In other embodiments, when the processor 204 uses a pose estimation neural network to process the human body image 500, the pose estimation neural network may also only generate a texture coordinate map corresponding to the region of interest above. Moreover, if there are a plurality of regions of interest, the processor 204 may also generate a texture coordinate map corresponding to each region of interest, but is not limited thereto.

In this case, the specific neural network adopting the feature map of the pose estimation neural network may obtain the texture coordinate map 500*a* accordingly. Moreover, if the trunk joint point under consideration is the right shoulder, the processor 204 may define a region in the texture coordinate map 500*a* based on the corresponding region of interest, and find the partitions 511 and 512 corresponding to the upper right arm and lower right arm (that is, the sub-limbs of the right arm) in this region.

Figure 6:
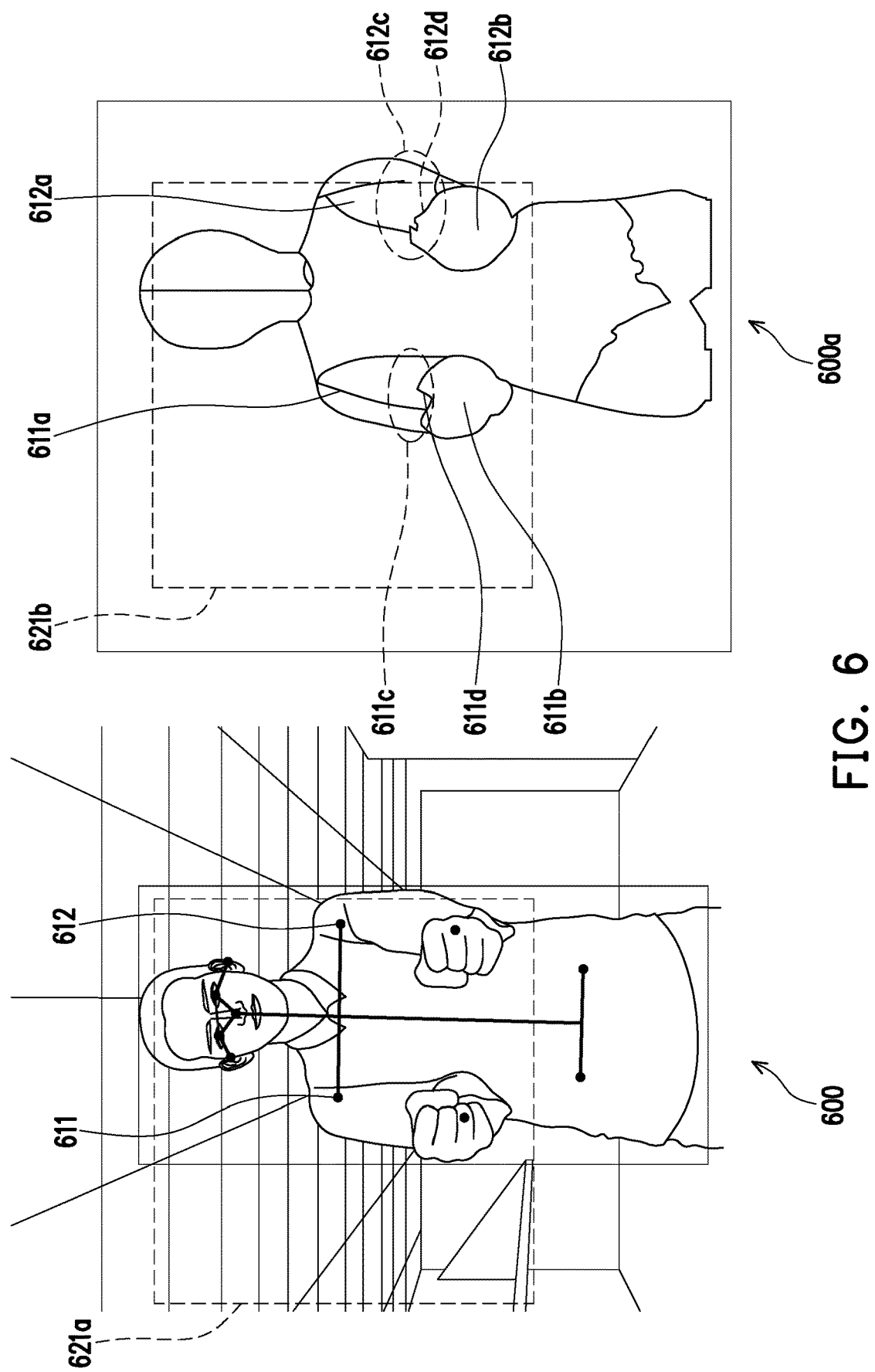
FIG. 6 is a human body pose skeleton and a corresponding texture coordinate map thereof shown according to an embodiment of the disclosure.

FIG. 6 is a human body pose skeleton and a corresponding texture coordinate map thereof shown according to an embodiment of the disclosure. In the present embodiment, when the processor 204 uses a pose estimation neural network to generate a human body pose skeleton 600, the pose estimation neural network (such as DensePose neural network) generates a corresponding texture coordinate map 600*a* at the same time.

In this case, the specific neural network adopting the feature map of the pose estimation neural network may also obtain the texture coordinate map 600*a* accordingly. Moreover, if the trunk joint point under consideration is a joint point 611 (that is, the trunk joint point of the right shoulder), the processor 204 may find a corresponding region 621*b* in the texture coordinate map 600*a* based on a region of interest 621*a* corresponding to the joint point 611, and find partitions 611*a* and 611*b* corresponding to the upper right arm and the lower right arm (that is, the sub-limbs of the right arm) in the region 621*b*.

Next, in step S350, a specific limb joint point is defined based on the partitions. Specifically, in step S350, the processor 204 may define a specific limb joint point based on the partitions. In an embodiment, the processor 204 may find an intersection area of the partitions, and use a specific point in the intersection area as the specific limb joint point.

Using the partitions 611*a* and 611*b* of FIG. 6 as an example, the processor 204 may find an intersection region 611*c* of the partitions 611*a* and 611*b* accordingly, and use a specific point in the intersection region 611*c* as a specific limb joint point 611*d*. In an embodiment, the processor 204 may use the central point of the intersection region 611*c* as the specific limb joint point 611*d*, but the disclosure may not be limited thereto. In other embodiments, the designer may also select any point from the intersection region 611*c* as the specific limb joint point as needed. In this case, the found specific limb joint point 611*d* may be regarded as the location of the right elbow (that is, the limb joint) estimated by the method of the disclosure.

Then, in step S360, the specific limb joint point is defined as corresponding to a limb joint, and the human body pose skeleton is updated accordingly. Specifically, in step S360, the processor 204 may define the specific limb joint point as corresponding to a limb joint, and update the human body pose skeleton accordingly.

In an embodiment, the processor 204 may first find a limb joint point corresponding to the limb joint in the joint points in the human body pose skeleton. In response to finding the limb joint point, the processor 204 may replace the limb joint point with the specific limb joint point to update the human body pose skeleton. Moreover, in response to not finding the limb joint point, the processor 204 may use the specific limb joint point as the limb joint point to update the human body pose skeleton.

Using the joint point 611 of FIG. 6 as an example, since the corresponding limb joint thereof is the right elbow, the processor 204 may find the limb joint point corresponding to the right elbow in each joint point of the human body pose skeleton 600. In the present embodiment, since the human body pose skeleton 600 may not originally include the limb joint point corresponding to the right elbow (that is, the limb joint point is not found), the processor 204 may directly use the specific limb joint point 611*d* as the limb joint point corresponding to the right elbow to update the human body pose skeleton 600. In other embodiments, if the human body pose skeleton (such as the human body pose skeleton 400*a* of FIG. 4A) under consideration originally includes the limb joint point corresponding to the right elbow (such as the joint point J8 of FIG. 4A), the processor 204 may replace the limb joint point with the obtained specific limb joint point after finding the limb joint point to update the human body pose skeleton.

Figure 7B:
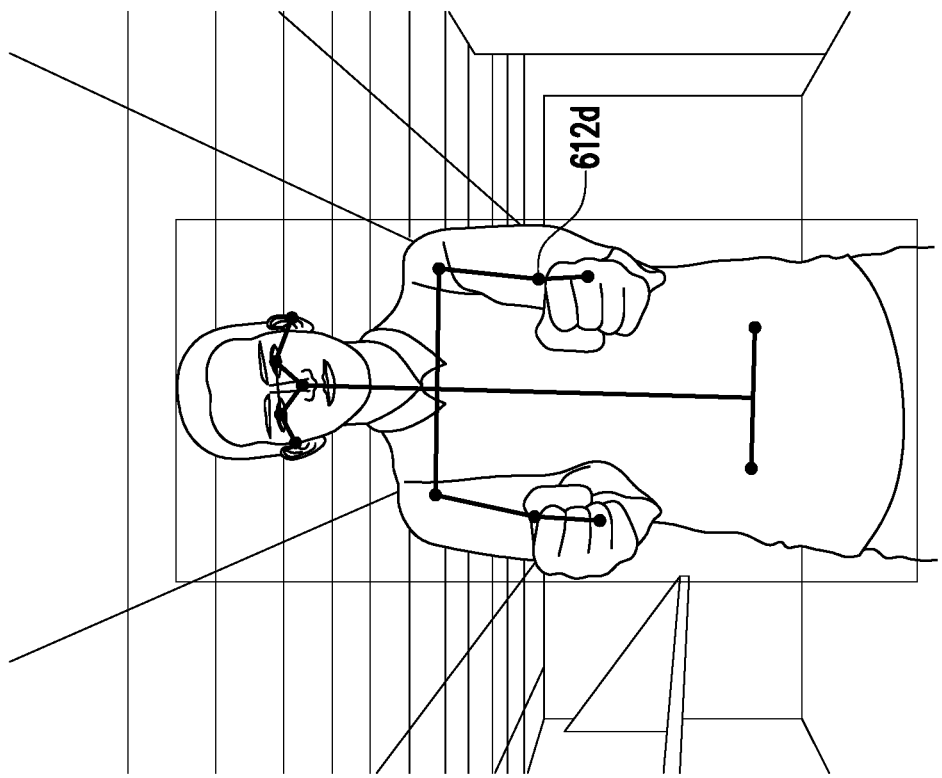
FIG. 7B is an updated human body pose skeleton shown according to FIG. 7A.
Figure 7A:
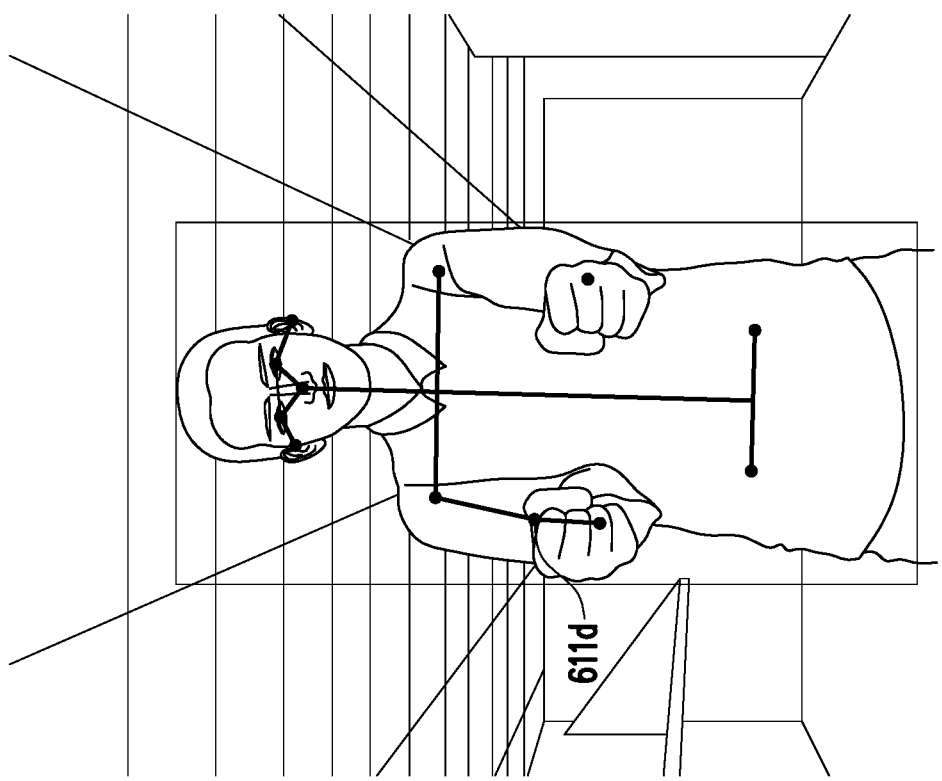
FIG. 7A is an updated human body pose skeleton shown according to FIG. 6.

FIG. 7A is an updated human body pose skeleton shown according to FIG. 6. As shown in FIG. 7A, after the specific limb joint point 611*d* is used as the limb joint point corresponding to the right elbow, the human body pose skeleton 600 of FIG. 6 may be updated to a human body pose skeleton 700*a* (labeled with the specific limb joint point 611*d* corresponding to the right elbow) shown in FIG. 7A.

As may be seen from the above, in the method of the disclosure, after one trunk joint point is found, a relevant region of interest may be defined accordingly, and the partitions corresponding to the sub-limbs of the limb of the trunk joint point may be found in the texture coordinate map based on this region of interest. Then, the specific limb joint point may be found based on the partitions, and the human body pose skeleton may be updated by using the specific limb joint point as the limb joint point on the limb. In this way, even if there are covered limb joints (such as elbows, etc.) in the original human body pose skeleton, the method of the disclosure may still find the limb joints, thereby improving the detection performance of the human body pose.

In addition, although the above is based on only one trunk joint point, in the method of the disclosure, the same operation may also be performed on other trunk joint points to find the corresponding limb joint.

For example, after the human body pose skeleton 700*a* of FIG. 7A is generated, the processor 204 may use the joint point 612 of FIG. 6 as the trunk joint point (that is, the trunk joint point of the left shoulder) under consideration. In this case, the processor 204 may find the corresponding region in the texture coordinate map 600*a* based on the region of interest (not shown) corresponding to the joint point 612 and find the partitions 612*a* and 612*b* corresponding to the upper left arm and lower left arm (that is, the sub-limbs of the left arm) in this region.

Next, the processor 204 may find an intersection region 612*c* of the partitions 612*a* and 612*b* accordingly and use a specific point (for example, the central point) in the intersection region 612*c* as a specific limb joint point 612*d*. In this case, the found specific limb joint point 612*d* may be regarded as the location of the limb joint of the left elbow estimated by the method of the disclosure.

Moreover, since the limb joint corresponding to the joint point 612 is the left elbow, the processor 204 may find the limb joint point corresponding to the left elbow in each joint point of the human body pose skeleton 600. In the present embodiment, since the human body pose skeleton 600 may not originally include the limb joint point corresponding to the left elbow, the processor 204 may directly use the specific limb joint point 612*d* as the limb joint point corresponding to the left elbow to update the human body pose skeleton 700*a*.

FIG. 7B is an updated human body pose skeleton shown according to FIG. 7A. As shown in FIG. 7B, after the specific limb joint point 612*d* is used as the limb joint point corresponding to the left elbow, the human body pose skeleton 700*a* of FIG. 7A may be updated to a human body pose skeleton 700*b* (labeled with the specific limb joint point 612*d* corresponding to the left elbow) shown in FIG. 7B.

In an embodiment, if the processor 204 is unable to find a plurality of partitions corresponding to the sub-limbs based on the region of interest due to the size of the region of interest being too small or the shape thereof being unsuitable (that is, step S340 may not be successfully performed), the processor 204 may adjust the region of interest via expansion, rotation, etc., and attempt to find a plurality of partitions corresponding to the sub-limbs again based on the adjusted region of interest.

In other embodiments, the processor 204 may also define a plurality of regions of interest for a single trunk joint point and attempt to find a plurality of partitions corresponding to the sub-limbs based on each region of interest so as to find the specific limb joint point corresponding to each region of interest based on the partition corresponding to each region of interest. Next, the processor 204 may further integrate the specific limb joint points corresponding to each region of interest into a single specific limb joint point and use the specific limb joint point as the basis for updating the human body pose skeleton.

It should be understood that, regardless of whether there are covered limb joint points in the human body image under consideration, all of the methods proposed by the disclosure may be used to find a specific limb joint point associated with the trunk joint point and adaptively replace the found specific limb joint point with the original limb joint point.

Taking FIG. 4A as an example, although the human body image 400 thereof does not have a covered joint point, the device and method of the disclosure may still find specific limb joint points corresponding to limb joint points such as the joint points J8, J9, J14, and J15 based on the human body image 400 and the human body pose skeleton 400*a*, and replace the limb joint points with the specific limb joint points to update the human body pose skeleton 400*a*.

Further taking FIG. 5 as an example, although the human body image 500 thereof also has no covered joint points, the device and method of the disclosure may still find a specific limb joint point corresponding to each limb joint point (for example, elbows and knees) based on the human body image 500 and the corresponding human body pose skeleton thereof (not shown) and replace the limb joint point with the specific limb joint point to update the human body pose skeleton.

In addition, further taking to FIG. 6 as an example, although there are covered limb joint points, the device and method of the disclosure may still find the specific limb joint point corresponding to each limb joint point (such as elbows and knees) based on the human body pose skeleton 600 and use the specific limb joint point as the limb joint point to update the human body pose skeleton.

Based on the above, the method and device of the disclosure may find a plurality of joint points in the human body image via a pose estimation neural network and obtain trunk joint points therefrom. Then, in the disclosure, the relevant region of interest may be defined based on one trunk joint point, and the partitions corresponding to the sub-limbs of the limb of the trunk joint point may be found based on the region of interest via a specific neural network (adopting the feature map of the pose estimation neural network). Based on the partitions, the method of the disclosure may further find out the specific limb joint point, and use the specific limb joint point as the limb joint point on the limb so as to update the human body pose skeleton. In this way, even if there are covered limb joints (such as elbows, etc.) in the original human body pose skeleton, the method of the disclosure may still find the limb joints, thereby improving the detection performance of the human body pose.

From another point of view, the disclosure may be considered to include two stages. In the first stage, the joint points in the human body image may be detected via a pose estimation neural network (such as a CNN implemented by top-down or bottom-up). In this way, preliminary human joint points may be obtained in the first stage, and in the disclosure, trunk joint points such as left shoulder, right shoulder, left hip, right hip, etc. may be found in the joint points, and one or a plurality of regions of interest may be individually generated.

In the second stage, in the disclosure, the partitions located on the four limbs may be found via the partition and detection of human body parts constructed by a specific neural network (such as a CNN implemented by bottom-up) on the basis of the region of interest found in the first stage, and the limb joint points on the four limbs may be restored and corrected based on the partitions located on the four limbs. In addition, in order to avoid processing too many regions of interest, in the disclosure, limb joint points may be found via the CNN of the second stage by adopting the feature map obtained by the CNN of the first stage during calculation. In this way, compared with the method in which each region of interest needs to go through more convolutional layers, in the disclosure, less convolutional layers are needed in the second stage to more efficiently partition the four limbs in each region of interest. Next, in the disclosure, the limb joint points on the four limbs may be analyzed via the partitions. Then, in the disclosure, a more complete human body joint point and human body pose skeleton may be obtained via a method such as linear regression analysis after the limb joint points found in the second stage and the human body pose skeleton in the first stage are combined, so as to facilitate subsequent relevant pose analysis operations.

The embodiments described above are only for explaining the technical ideas and characteristics of the present disclosure, and the purpose thereof is to enable those skilled in the art to understand and accordingly implement the contents of the present disclosure. It is not intended to limit the scope of the present disclosure, that is, any equivalent change or modification made based on the spirit disclosed by the present disclosure shall fall within the patented scope of the present disclosure.

What is claimed is:

1. A method for joint point detection, comprising:
  obtaining a human body image and finding a plurality of joint points in the human body image to generate a human body pose skeleton, wherein the human body image comprises a trunk joint and a first limb;
  finding a first trunk joint point corresponding to a first trunk joint in the joint points, wherein the first trunk joint is located at a trunk portion of the human body image, the first trunk joint is connected to the first limb, the first limb comprises a plurality of first sub-limbs, and the first sub-limbs are connected to each other via at least one first limb joint;
  defining a first region of interest corresponding to the first trunk joint point in the human body pose skeleton;
  finding a plurality of first partitions corresponding to the first sub-limbs based on the first region of interest;
  defining a first specific limb joint point based on the first partitions; and
  defining the first specific limb joint point as corresponding to the first limb joint, and accordingly updating the human body pose skeleton.

2. The method of claim 1, wherein the step of finding the joint points in the human body image to generate the human body pose skeleton comprises:
  inputting the human body image to a pose estimation neural network to find the joint points on the human body image from the pose estimation neural network and connect the joint points to form the human body pose skeleton.

3. The method of claim 2, wherein the pose estimation neural network is designed based on a top-down method or a bottom-up method.

4. The method of claim 2, wherein the pose estimation neural network is a DensePose neural network or an OpenPose neural network.

5. The method of claim 2, wherein the first trunk joint point is located in a center of the first region of interest.

6. The method of claim 2, wherein the pose estimation neural network has a convolutional layer, the convolutional layer corresponds to a feature map, and the step of finding the first partitions corresponding to the first sub-limbs based on the first region of interest comprises:
  inputting the first region of interest to a specific neural network adopting the feature map to find the first partitions corresponding to the first sub-limbs based on the first region of interest via the specific neural network.

7. The method of claim 6, wherein the specific neural network has a convolutional layer, and the step of finding the first partitions corresponding to the first sub-limbs based on the first region of interest via the specific neural network comprises:
generating a texture coordinate map corresponding to the first region of interest based on the feature map via the specific neural network; and
finding the first partitions corresponding to the first sub-limbs in the texture coordinate map via the specific neural network.

8. The method of claim 6, wherein the specific neural network is a convolutional neural network comprising a convolutional layer.

9. The method of claim 1, wherein the step of defining the first specific limb joint point based on the first partitions comprises:
finding an intersection area of the first partitions; and
using a specific point in the intersection area as the first specific limb joint point.

10. The method of claim 9, wherein the specific point in the intersection area is a central point of the intersection area.

11. The method of claim 1, further comprising:
finding a second trunk joint point located in the trunk portion of the human body in the joint points;
defining a second region of interest corresponding to the second trunk joint point in the human body pose skeleton, wherein the second trunk joint point is connected to a second limb of the human body, the second limb comprises a plurality of second sub-limbs, and the second sub-limbs are connected to each other via at least one second limb joint;
finding a plurality of second partitions corresponding to the second sub-limbs based on the second region of interest;
defining a second specific limb joint point based on the second partitions located in the second region of interest; and
defining the second specific limb joint point as corresponding to the second limb joint, and accordingly updating the human body pose skeleton.

12. The method of claim 1, wherein the step of defining the first specific limb joint point as corresponding to the first limb joint and accordingly updating the human body pose skeleton comprises:
finding a first limb joint point corresponding to the first limb joint from the joint points of the human body pose skeleton;
replacing the first limb joint point with the first specific limb joint point in response to finding the first limb joint point to update the human body pose skeleton; and
using the first specific limb joint point as the first limb joint point in response to not finding the first limb joint point to update the human body pose skeleton.

13. A device for joint point detection, comprising:
a storage circuit storing a program code; and
a processor coupled to the storage circuit and accessing the program code to perform the following steps:
obtaining a human body image and finding a plurality of joint points in the human body image to generate a human body pose skeleton, wherein the human body image comprises a trunk joint and a first limb;
finding a first trunk joint point corresponding to a first trunk joint in the joint points;
defining a first region of interest corresponding to the first trunk joint point in the human body pose skeleton, wherein the first trunk joint is located at a trunk portion of the human body image, the first trunk joint is connected to the first limb, the first limb comprises a plurality of first sub-limbs, and the first sub-limbs are connected to each other via at least one first limb joint;
finding a plurality of first partitions corresponding to the first sub-limbs based on the first region of interest;
defining a first specific limb joint point based on the first partitions; and
defining the first specific limb joint point as corresponding to the first limb joint, and accordingly updating the human body pose skeleton.

14. The device of claim 13, wherein the processor is configured to:
input the human body image to a pose estimation neural network to find the joint points on the human body image from the pose estimation neural network and connect the joint points to form the human body pose skeleton.

15. The device of claim 14, wherein the pose estimation neural network is designed based on a top-down method or a bottom-up method.

16. The device of claim 14, wherein the pose estimation neural network has a convolutional layer, the convolutional layer corresponds to a feature map, and the processor is configured to:
input the first region of interest to a specific neural network adopting the feature map to find the first partitions corresponding to the first sub-limbs based on the first region of interest via the specific neural network.

17. The device of claim 16, wherein the specific neural network has a convolutional layer, and the processor is configured to:
generate a texture coordinate map corresponding to the first region of interest based on the feature map via the specific neural network; and
find the first partitions corresponding to the first sub-limbs in the texture coordinate map via the specific neural network.

18. The device of claim 13, wherein the processor is configured to:
find an intersection area of the first partitions; and
use a specific point in the intersection area as the first specific limb joint point.

19. The device of claim 13, wherein the processor is further configured to:
find a second trunk joint point located in the trunk portion of a human body in the joint points;
define a second region of interest corresponding to the second trunk joint point in the human body pose skeleton, wherein the second trunk joint point is connected to a second limb of the human body, the second limb comprises a plurality of second sub-limbs, and the second sub-limbs are connected to each other via at least one second limb joint;
find a plurality of second partitions corresponding to the second sub-limbs based on the second region of interest;

define a second specific limb joint point based on the second partitions located in the second region of interest; and define the second specific limb joint point as corresponding to the second limb joint, and accordingly updating the human body pose skeleton.

20. The device of claim 13, wherein the processor is configured to:

find a first limb joint point corresponding to the first limb joint from the joint points of the human body pose skeleton;

replace the first limb joint point with the first specific limb joint point in response to finding the first limb joint point to update the human body pose skeleton; and use the first specific limb joint point as the first limb joint point in response to not finding the first limb joint point to update the human body pose skeleton.

* * * * *